Aug. 12, 1924.

H. F. OPPERMAN 1,504,370

FRUIT DELIVERING APPARATUS FOR PEELING MACHINES

Filed May 5, 1924

Inventor
Hugh F. Opperman

By Lyon+Lyon
Attorney

Patented Aug. 12, 1924.

1,504,370

UNITED STATES PATENT OFFICE.

HUGH F. OPPERMAN, OF HONOLULU, TERRITORY OF HAWAII, ASSIGNOR TO CALIFORNIA PACKING CORPORATION, OF NEW YORK, N. Y., A CORPORATION OF NEW YORK.

FRUIT-DELIVERING APPARATUS FOR PEELING MACHINES.

Application filed May 5, 1924. Serial No. 711,183.

*To all whom it may concern:*

Be it known that I, HUGH F. OPPERMAN, a citizen of the United States, residing at Honolulu, Territory of Hawaii, have invented a new and useful Fruit-Delivering Apparatus for Peeling Machines, of which the following is a specification.

This invention relates to an attachment to cooperate with a fruit peeling machine and fruit trimming machines. While features of the invention may be applicable to machines for operating upon fruit of different kinds, the invention is intended to be used in connection with pineapple machines. In practice, the pineapples are peeled in a machine which reduces them to substantially cylindrical form, and they are then taken from this machine to a trimming machine which completes the operation by trimming the fruit.

The peeling machine has a higher capacity than the trimming machines, for which reason one peeling machine may keep two or more trimming machines in operation. The general object of this invention is to provide apparatus for receiving the peeled fruit from the peeling machine and passing the same to the trimming machines; the apparatus operates in such a way as to guide the fruit automatically to the different trimming machines. A further object of the invention is to provide improved means for effecting guiding of the fruit to different trimming machines by very simple means controlled by a moving part of the peeling machine.

Further objects of the invention will appear hereinafter.

The invention consists in the novel parts and combination of parts to be described hereinafter, all of which contribute to produce an efficient fruit delivering apparatus for peeling machines.

A preferred embodiment of the invention is described in the following specification, while the broad scope of the invention is pointed out in the appended claims.

Figure 1:
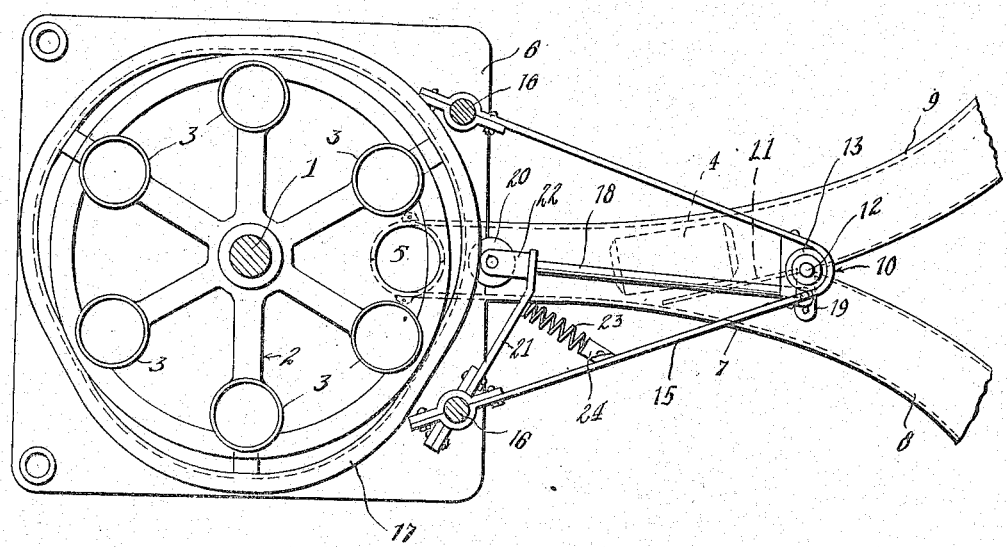
Figure 1 is a horizontal section taken about on the line 1—1 of Figure 2 and illustrating the turret of a peeling machine, such as a Ginaca machine, and showing an embodiment of my invention applied to the same.
Figure 2:
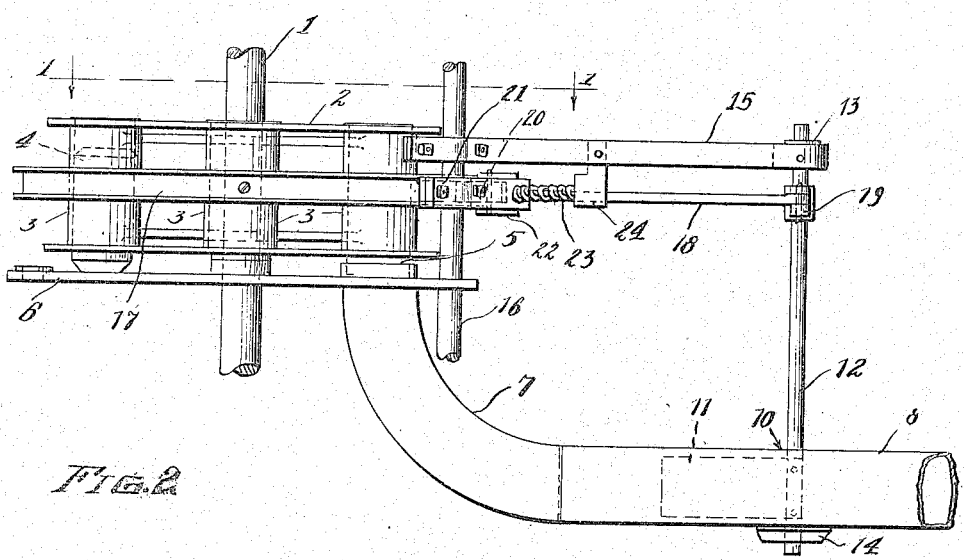
Fig. 2 is a side elevation of the apparatus shown in Figure 1.

Referring to the parts, 1 represents the spindle of the peeling machine, carrying a turret 2, the said turret having a plurality of fruit holders or sockets 3 in which the peeled pineapples or "pines" 4 are received. This turret is rotated automatically with a step-by-step movement so that these holders 3 are brought in succession into alignment with a delivery opening 5 in the frame plate 6. From the opening 5 I provide guiding means 7 which may be in the form of a bent conveyor tube which is in the form of an elbow, the horizontal portion of which is provided with branches 8, 9 leading, or adapted to lead respectively to the different trimming machines to which the peeled fruit is to be delivered.

According to my invention, I provide automatic means for guiding the fruit into the different branches successively. In the present instance, I provide a switch device 10 which may comprise a switch plate 11 secured to a spindle 12 having its axis of rotation located at the junction point of the branches. This spindle is supported to rotate in suitable bearings 13 and 14, the latter of which may be associated with the guiding means, and the former of which may be supported in a horizontal bracket 15 which may be in the form of an A-frame, the legs of which are secured to posts 16 which constitute parts of the frame of the peeling machine.

The switch device may be held in different positions so as to switch the fruit into the different branches. In other words, the switch device is controlled automatically from the peeling machine. In order to accomplish this, I actuate the switch plate 11 by a part which moves with the turret and in the present instance this part is in the form of a cam 17 of channel shape and operating to actuate a stem 18 which is pivotally attached to a short arm 19 rigid on the spindle 12. In order to reduce the friction, the inner end of the stem 18 is formed with a roller 20 which rolls on the cam. I provide suitable means for holding the roller against the cam. For this purpose I provide the loose arm 21 on one of the posts 16, and this arm has an opening to receive the stem 18 located near the yoke 22 which carries the roller 20. A coil spring 23 is provided, which thrusts against the outer side of this arm 21, the outer end of the spring being secured on a bracket 24 which is attached to and extends down from the A-frame.

The cam 17 is so constructed that after delivering a "pine" through the opening 5, when the turret rotates to bring the next "pine" into position, the cam will operate the stem 18 to swing the switch plate 11 over to a second position, which will direct the next pineapple into the next branch leading to the next trimming machine. This operation is repeated for each step-by-step movement of the turret. In this way, the fruit is directed in succession to the different trimming machines.

It is understood that the embodiment of the invention described herein is only one of the many embodiments this invention may take, and I do not wish to be limited in the practice of the invention, nor in the claims, to the particular embodiment set forth.

What I claim is:—

1. In apparatus to cooperate with a fruit peeling machine and a plurality of fruit trimming machines, the combination of guiding means for receiving the fruit from the peeling machine, and having branches adapted to lead to different trimming machines, respectively, and automatic means for guiding the fruit into the different branches successively.

2. In apparatus of the kind described, to cooperate with a plurality of fruit trimming machines, the combination of a fruit peeling machine having a rotatable turret for carrying the fruit, guiding means for receiving the fruit from the turret and having branches adapted to lead to different trimming machines respectively, a switch-device for directing the fruit into the different branches respectively, and means moving with the turret for controlling the switch-device.

3. In apparatus of the kind described, to cooperate with a plurality of fruit trimming machines, the combination of a fruit peeling machine having a rotatable turret for carrying the fruit, guiding means for receiving the fruit from the turret and having branches adapted to lead to different trimming machines respectively, a switch-device for directing the fruit into the different branches respectively, a cam carried by the turret, and means actuated thereby and connected to the switch-device for actuating the same.

4. In apparatus of the kind described, to cooperate with fruit trimming machines, the combination of a fruit peeling machine having a rotatable turret for carrying the fruit, guiding means for receiving the fruit from the turret and having branches adapted to lead to trimming machines respectively, a switch-device located at the junction of the branches for directing the fruit into either of the branches, a cam carried by the turret, and means actuated by the cam for controlling the switch-device.

5. In apparatus of the kind described, to cooperate with a plurality of fruit trimming machines, the combination of a fruit peeling machine having a rotatable turret for carrying the fruit, guiding means for receiving the fruit from the turret and having branches adapted to lead to different trimming machines respectively, a bracket supported on the peeling machine, a switch-device carried by the bracket and located at the junction of the branches, means rotating with the turret, and means actuated by the last named means for controlling the switch-device.

6. In apparatus of the kind described, to cooperate with fruit trimming machines, the combination of a fruit peeling machine having a rotatable turret for carrying the fruit, guiding means for receiving the fruit from the turret and having branches adapted to lead to trimming machines respectively, a switch-device including a switch member mounted to rock on an axis located adjacent the junction of the branches, an actuating stem connected with the switch member for swinging it, means for supporting the stem, a cam on the turret for actuating the actuating stem, and means for holding the actuating stem against the cam.

Signed at Honolulu, T. H., this 7th day of April, 1924.

HUGH F. OPPERMAN.